(12) United States Patent
Marshall et al.

(10) Patent No.: US 7,679,792 B2
(45) Date of Patent: Mar. 16, 2010

(54) MERGED CAMERA AND SCANNER

(75) Inventors: Andrew Marshall, Dallas, TX (US);
Tito Gelsomini, Plano, TX (US);
Harvey Edd Davis, Trenton, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1075 days.

(21) Appl. No.: 11/305,520

(22) Filed: Dec. 16, 2005

(65) Prior Publication Data
US 2006/0164694 A1 Jul. 27, 2006

Related U.S. Application Data

(60) Provisional application No. 60/636,509, filed on Dec. 16, 2004.

(51) Int. Cl.
*H04N 1/04* (2006.01)
*H04N 1/46* (2006.01)
(52) U.S. Cl. .................................. 358/474; 358/505
(58) Field of Classification Search ................. 358/474, 358/505, 501, 401; 348/207.99, 208.5, 208.7
See application file for complete search history.

(56) References Cited

U.S. PATENT DOCUMENTS 6,540,415 B1 * 4/2003 Slatter et al. ............... 396/428

2003/0112363 A1 * 6/2003 Oliver

\* cited by examiner

*Primary Examiner*—Douglas Q Tran
(74) *Attorney, Agent, or Firm*—Warren L. Franz; Wade J. Brady, III; Frederick J. Telecky, Jr.

(57) ABSTRACT

A narrow scanning aperture, lens, and mirror are added to a digital camera to enable image or text scanning. A motion sensor on the same face as the scanner aperture provides approximate scan speed data as the scanner aperture is pressed against and manually moved across the document being scanned. Many documents are too large to scan in one strip, in which case multiple strips are scanned. As each strip is scanned, a bit-mapped image of the strip is created in a data buffer. Data from each strip is passed to a final image RAM which, on completion of scanning, holds a bit-mapped image of the entire scanned page, in B/W, gray scale, or color. Multi pass strip align then processes the image data to remove redundant data (from strip overlap) and position skew (from errors in position during the scan), resulting in a more accurate bit-mapped image in final image RAM of the entire scanned page or item. Image compression compresses the bit-mapped image to standard JPEG format for storage on the camera memory card. An alternative embodiment stores each scanned strip as a separate image. After strip images are downloaded to the PC, software on the PC "stitches" these strips back into the full page by eliminating redundant pixels and strip-to-strip misalignment.

6 Claims, 2 Drawing Sheets

MERGED CAMERA AND SCANNER

CROSS-REFERENCE TO RELATED APPLICATION

This application claims priority under 35 U.S.C. 119 of provisional application Ser. No. 60/636,509, filed Dec. 16, 2004, the entirety of which is incorporated herein by reference.

This disclosure relates to electronic imaging in general, and, in particular, to the combination of a document scanning system and a digital camera.

BACKGROUND

Digital cameras have been widely adopted by both amateur and professional photographers. As resolution of digital cameras increases, and the cost of non-volatile memory cards decreases, more photographers are moving from film to electronic imaging.

The resolution of many current digital cameras ranges from 2.1 megapixels (MP) to 4.2 MP. Cameras with higher resolution are available but are typically used by advanced amateurs or professionals. A 2.1 MP camera captures an image as an array of 1600 (horizontal) by 1200 (vertical) pixels; a 4.2 MP camera has an image sensor with a 2272× 1704 array of pixels. Images from a 2.1 MP camera can be typically enlarged to 5×7 inch prints with good results; 3.3 MP and 4.2 MP cameras yield very satisfactory prints to 8×10 inches.

Data from the image sensor is typically compressed using joint photographic experts group (JPEG) processing to decrease the size of the image file, and the file is then stored on a non-volatile memory card in the camera. Image files can then be downloaded to a computer, emailed to others, modified to enhance the image, and printed on low-cost consumer printers.

One use of a digital camera is to capture images of documents. Many digital cameras have auto focus capability allowing accurate focus on, for example, an 8.5×11 inch document. Given adequate lighting, an image of the page can be obtained. However, the limited resolution of the camera limits imaging of small text or detail in document illustrations. If the 11-inch dimension of a document is aligned with the larger (horizontal) imaging axis, a 4.2 MP image sensor provides 2272 pixels/11 inches, or 206 pixels per inch of document. Many document scanners use at least 300 pixels per inch (more commonly referred to as "dots per inch" or DPI). Even a 4.2 MP camera falls considerably short of this level. More common 2.1 MP or 3.3 MP cameras provide even less resolution.

Linear scanners capable of 300 DPI and higher are widely used in flatbed scanners and facsimile machines. The document to be scanned is either moved past the linear scanner (typical in facsimile machines) or the scanner is moved past the document (typical in flatbed scanners). Portable scanners have been developed which are manually moved across a document to be scanned, in one or more passes depending on the scanner width and size of the document. These portable scanners typically have internal memory for storing the images scanned, which can later be transferred to a PC.

SUMMARY

The invention provides an apparatus and method for combining a linear optical scanner with a digital camera, enabling high-resolution hand-held scanning of documents and storage of these documents as compressed image files.

A long, narrow lens is placed on one edge of the camera, providing a scanner aperture which is placed in contact with a document and moved across it. Light reflected from the document and passed through this lens is then routed to the camera's existing image sensor. A hinged or sliding mirror is placed in the light path for scanning to reflect light from this lens to the sensor; the mirror is moved to a second position for normal camera use. The edge of the camera with the linear scanning aperture is placed against a document to be scanned, and moved across a strip of the document. Multiple scans are made to capture the entire document in strips. The movement of the camera across the document is sensed using mechanical wheel or optical mouse technology. The image data from each strip is then compressed and stored in the existing camera memory.

The ability to scan and store document images of high resolution using a digital camera is a capability many business and casual users would embrace.

BRIEF DESCRIPPTION OF THE DRAWINGS

DETAILED DESCRIPTION OF THE EMBODIMENTS

Figure 1:
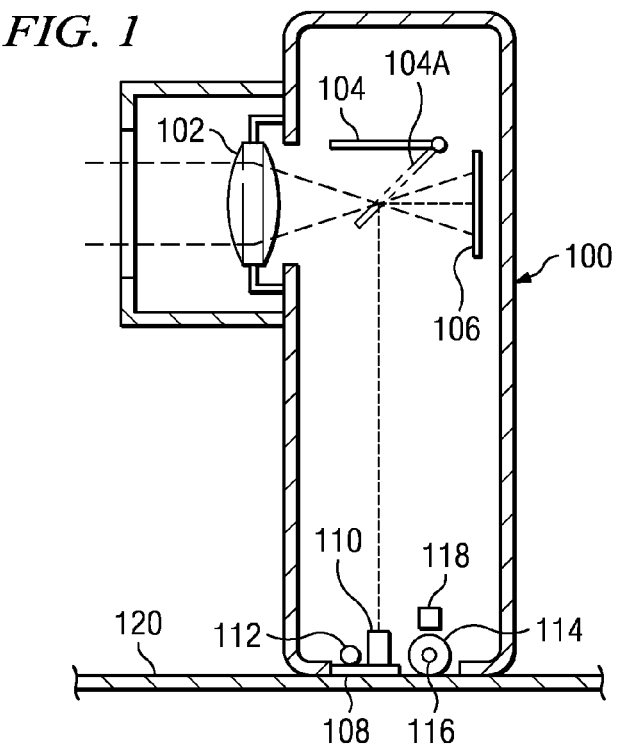
FIG. 1 is a drawing of one embodiment of the present invention showing a digital camera with a linear scanner lens on one side of the camera, with movable internal mirror and single M×N photosensitive image array used for both photography and scanning.

In FIG. 1, a digital camera 100 has on one side of the housing an optical window 108 and lens element 110. Ambient light or light from internal linear light source 112 is reflected from the document 120, through lens 110, is further reflected by mirror 104A, and impinges on photosensitive sensor array 106.

The document to be scanned is typically larger than the span of the linear scanner, so multiple passes must be made across the document. This is typically done in strips across the page. A mechanical position sensor comprising wheel 114, axle 116, and rotational sensor 118 is positioned on the same edge of the housing as lens 110. This motion sensor generates data on scan start, scan end, and scan speed. Alternatively, an optical motion sensor or accelerometer within the camera may be used to detect scan movement across the page. With this data, the beginning and end of each scanned strip is determined, facilitating electronic alignment and removal of redundant data of the strips on scan completion.

When normal photography is desired, mirror 104 is rotated or otherwise positioned so that light from the scanned lens no longer is reflected to the imager array. The camera lens focuses the photographic image on sensor array 106 as shown.

Figure 2:
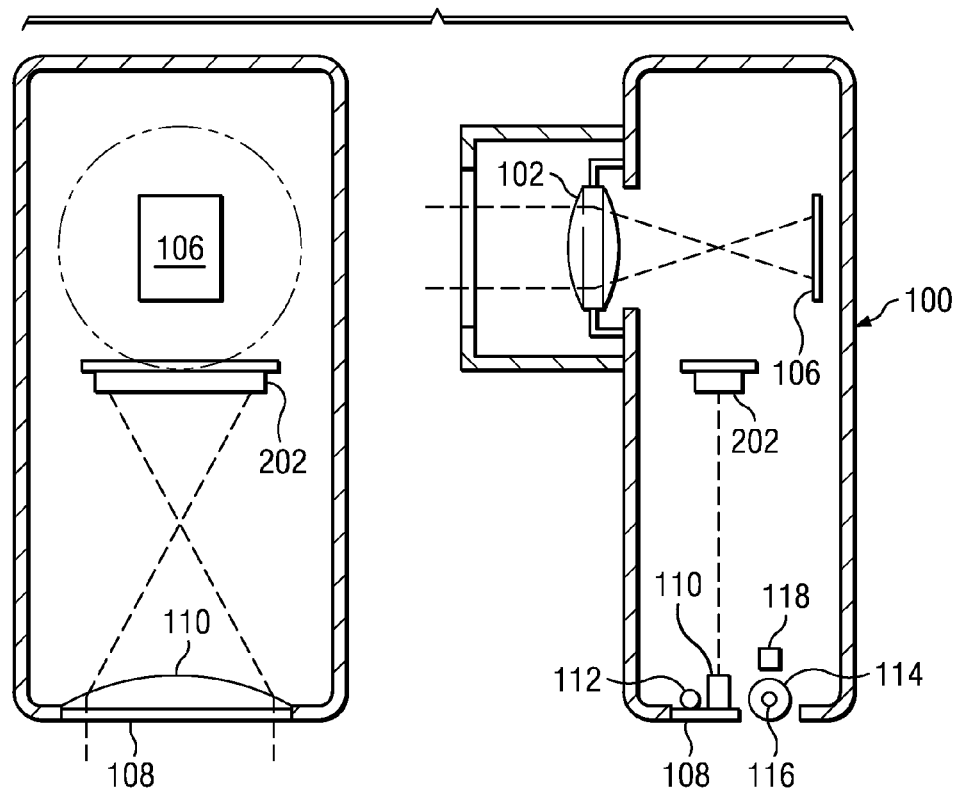
FIG. 2 is a drawing of one embodiment of the present invention showing a digital camera with a linear scanner lens on one side of the camera, with second 1×N linear sensor dedicated to scanning function.

FIG. 2 shows an alternative embodiment using a second image sensor 202 devoted to the scanner function. Light rays from lens 110 are focused on linear sensor 202. A linear sensor is an array of 1×N photosensitive elements. For example, a 1×1024 pixel linear sensor in conjunction with a 3 inch scan aperture length yields a DPI of 1024/3, or 341 DPI. Lens 110 is tailored to the width of the scan aperture and the image sensor. Typical scan widths are 2 to 3 inches, depending on the size of the camera.

The embodiment of FIG. 2 avoids the mechanical complexity of a movable mirror as in FIG. 1, but at the expense of the linear sensor.

Figure 3:
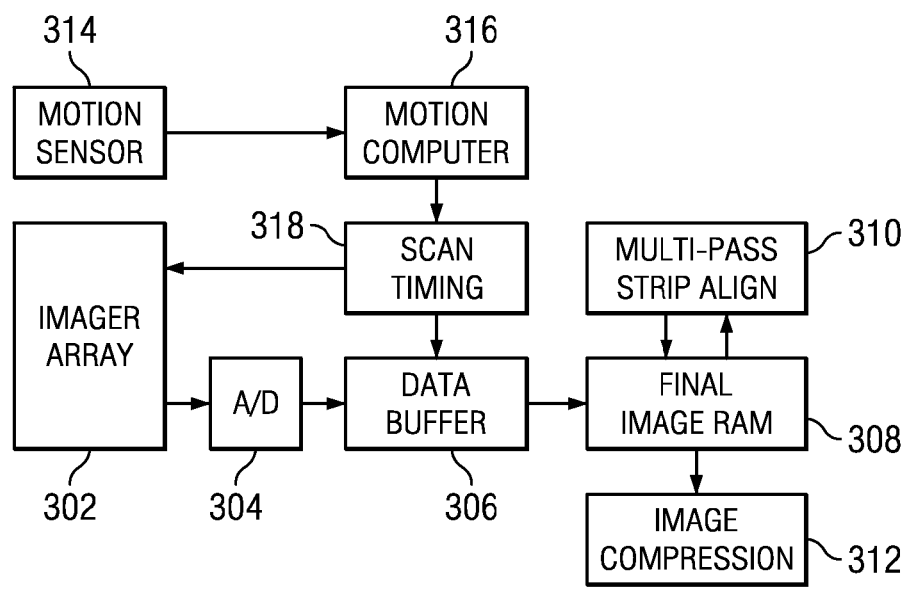
FIG. 3 is a block diagram of the added functions supporting scanner operation. Throughout the drawings, like elements are referred to by like numerals.

The block diagram of FIG. 3 shows the functional blocks added to a digital camera to support scanning. Those skilled in the art will recognize that some elements of FIG. 3 will be common to the digital camera function, for example image sensor array 302, image RAM 308, and image compression 312.

Imager array 302 is either the M×N area sensor used also for photography, or a 1×N linear sensor dedicated to scanning. Analog to digital (A/D) converter 304 converts from analog to digital signals representing brightness at each scanned point. Digitized brightness data is then input to data buffer 306, which has enough memory capacity to save at least one scanned strip.

Motion sensor 314 in one embodiment is a mechanical roller and associated rotation sensor. The rotation sensor 118 converts rotation of 114 into electrical pulses at a rate proportional to the speed of movement across the document being scanned. Motion sensing in another embodiment is implemented with optical sensors, as in current optical mouse designs. Optical motion sensing can also be done using one or more elements of the scanning array, eliminating the need for additional mechanical or optical elements.

Scanner imager array 302 is a M×N or 1×N array of photosensitive elements. The relationship between number of elements, DPI, and scan width is given by DPI=Number of array elements/Scan width.

For example, a 2.1 MP imager array has 1600 elements across its widest dimension as described above. A scanned aperture (width of lens 108) of 2.5 inches therefore provides 1600/2.5 DPI or 640 DPI. When the lens 108 (vertically oriented on the page to be scanned) is slowly moved horizontally across the page, scan timing circuit 318 provides signals to array 302 which sequentially activate or address each photosensitive element. Each element in turn then outputs to A/D 304 a voltage representative of the brightness on the page at that element position. The output of A/D 304 is thus a sequential digital representation of the brightness at each element position.

Motion computer 316 processes raw data from the motion sensor 314 to generate approximate scan speed and start of scan/end of scan signals. These motion signals then are input to scan timing 318.

Scan timing 318 clocks (controls the sequential readout of data) the scanner array, and thus has knowledge of the exact vertical position of each pixel in a strip. Scan timing 318 also has inputs from motion computer 316 which provide an approximate horizontal position for each pixel in the strip, based on start of scan and scan speed. This coarse position data is used to generate the appropriate memory address for each pixel in data buffer 306. Data for each pixel, from A/D 304, is stored at an appropriate location in data buffer 306. At the end of each strip scan, data buffer 306 thus has a bit mapped image of the scanned strip. This bit mapped image is then passed to final image RAM 308, and the data buffer 306 is cleared.

This process is repeated for each strip in the overall page scan. After all strips are scanned, pixel data for each strip is stored in a unique area of final image RAM 308. To insure capturing all information on a document, the user must overlap scan strips. Due to overlap of strips there is redundant data in final image RAM 308; there is also inaccuracy in position, especially horizontal position strip to strip.

The multi-pass strip align circuit 310 examines the data in the bit mapped image of final image RAM 308, looking for redundancy and position skew. Pixel data addresses are revised to eliminate this skew and redundancy, resulting in a much more accurate stored bit mapped image ready for additional processing.

Image compressor 312 takes bit mapped image data from final image RAM 308 and compresses it using one or more protocols such as JPEG. The resulting compressed image data is then stored on the same non-volatile memory card the camera uses for storing photographs.

An alternative embodiment eliminates multi-pass strip align 310 and final image RAM 308. In this embodiment, pixel data from each scanned strip is compressed and stored, treating each strip as an individual image. No strip align processing is done in the camera. In this case, after all images are downloaded to the personal computer (PC), software on the PC aligns strips and removes redundant data. This process is very similar to the known image "stitching" used to create panoramic images from a group of regular images.

Those skilled in the art to which the invention relates will appreciate that yet other substitutions and modifications can be made to the described embodiments, without departing from the spirit and scope of the invention as described by the claims.

The invention claimed is:

1. A digital camera adapted for digital photography and document scanning, the camera comprising:
   a housing;
   an image sensor for developing digital image data of light images received thereon;
   a lens located for focusing an image of an object to be photographed onto the image sensor;
   a memory for storing image data from the image sensor;
   a scanning aperture located for viewing at least a portion of a document to be scanned;
   a mirror, movable between a photography position creating an optical path from the lens to the image sensor and a scanning position creating an optical path from the scanning aperture to the sensor.

2. The camera of claim 1, further comprising a motion sensor adapted and positioned to sense motion of the scanning aperture across a document.

3. The camera of claim 2, wherein the housing includes a longitudinal edge and the scanning aperture is a longitudinal aperture located along the edge of the housing.

4. A method of scanning a document with a digital camera; the camera comprising a housing, an image sensor for developing digital image data, and a lens for focusing an object to be photographed onto the image sensor; and the method comprising:
   moving the camera housing along a path across a document to be scanned;
   developing digital image data with the image sensor of portions of the document as the housing is moved along the path;
   sensing the motion of the housing relative to the document as the housing is moved along the path;
   storing the image data in coordination with the sensed motion;
   whereby an image of the scanned document is obtained.

5. The method of claim 4, further comprising:
   providing a scanning aperture on the housing; and
   developing the image data of successive portions of the document as the aperture is moved along the path.

6. The method of claim 5, further comprising:
providing a mirror; and
moving the mirror between a photography position creating an optical path from the lens to the image sensor, and a scanning position creating an optical path from the scanning aperture to the sensor.

* * * * *